United States Patent
Parkkinen et al.

(10) Patent No.: US 9,495,398 B2
(45) Date of Patent: Nov. 15, 2016

(54) INDEX FOR HYBRID DATABASE

(75) Inventors: Jarmo Parkkinen, Helsinki (FI); Vilho T. Raatikka, Espoo (FI); Jarmo K. Ruuth, Espoo (FI); Petri U. Soini, Vantaa (FI); Antoni Wolski, Kirkkonummi (FI)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 79 days.

(21) Appl. No.: 13/360,886

(22) Filed: Jan. 30, 2012

(65) Prior Publication Data

US 2012/0215752 A1    Aug. 23, 2012

(30) Foreign Application Priority Data

Feb. 18, 2011   (EP) .................................... 11154977

(51) Int. Cl.
*G06F 17/00* (2006.01)
*G06F 17/30* (2006.01)
(52) U.S. Cl.
CPC ............................. *G06F 17/30312* (2013.01)
(58) Field of Classification Search
CPC ................................................ G06F 17/30312
USPC ....................................................... 707/705
See application file for complete search history.

(56) References Cited

U.S. PATENT DOCUMENTS

| | | | |
|---|---|---|---|
| 5,568,638 A * | 10/1996 | Hayashi et al. | .............. 707/613 |
| 7,113,953 B2 | 9/2006 | Brown et al. | |
| 7,809,674 B2 | 10/2010 | Chong et al. | |
| 8,180,763 B2 | 5/2012 | Freedman et al. | |
| 8,484,434 B2 | 7/2013 | Caprioli et al. | |
| 2008/0263061 A1* | 10/2008 | Nath | ................ G06F 17/30327 |
| 2009/0259644 A1 | 10/2009 | Scheuermann | |
| 2010/0217953 A1 | 8/2010 | Beaman et al. | |
| 2011/0208737 A1* | 8/2011 | Shmueli et al. | ............. 707/737 |
| 2011/0246425 A1 | 10/2011 | Munoz | |
| 2011/0252000 A1 | 10/2011 | Diaconu et al. | |
| 2012/0072652 A1 | 3/2012 | Celis et al. | |

(Continued)

FOREIGN PATENT DOCUMENTS

CN    102016808 A    4/2011

OTHER PUBLICATIONS

Michael Stonebraker, "Inclusion of New Types in Relational Data Base Systems", EECS Dept. University of California, Berkeley, ICDE, 1986—Citeseer.*

(Continued)

*Primary Examiner* — Mariela Reyes
*Assistant Examiner* — Mohsen Almani
(74) *Attorney, Agent, or Firm* — Cantor Colburn LLP; Steven Kurlowecz

(57) ABSTRACT

Providing an index for a database table that includes a first portion of rows stored in a memory device and a second portion of rows stored in a disk device. A request is received relating to a specific row of the database table. An index that includes entries for each row of the database table stored in the memory device and entries for a subset of the rows of the database table stored in the disk device is accessed. A connection is made to the memory device if the specific row is stored in the memory device, and a connection is made to the disk device if the specific row is stored in the disk device. An action related to the specific row is performed based on the received request.

19 Claims, 6 Drawing Sheets

(56) References Cited

U.S. PATENT DOCUMENTS

2012/0109895 A1  5/2012  Zwilling et al.
2012/0166756 A1  6/2012  Caprioli et al.

OTHER PUBLICATIONS

Hellerstein et al., "Readings in Database Systems", 2005 Massachusetts Institute of Technology.*

Guisado-Gamez, J. et al.; "Hybrid in-memory and on-disk tables for speeding up table accesses" in Database and Expert Systems Applications, Lecture Notes in Computer Science, 2011, vol. 6261/2011; pp. 231-240.

Graefe, G., "Adaptive Indexing for Relational Keys", Data Engineering Workshops (ICDEW), 2010 IEEE 26th International Conference on Date of Conference: Mar. 1-6, 2010, http://ieeexplore.ieee.org/xpl/articleDetails.jsp?tp=&arnumber=5452743&contentType=Conference+Publications&queryText%3Din-memory+indexes+and+traditional+buffer+pool+techniques, pp. 1-20.

Hu, Jinjin et al., "Research of Main Memory Database Data Organization", Multimedia Technology (ICMT), 2011 International Conference, Date of Conference: Jul. 26-28, 2011 IEEE, pp. 3187-3191.

* cited by examiner

INDEX FOR HYBRID DATABASE

PRIORITY

The present application claims priority to European Patent Application No. 11154977.0, filed on 18 Feb. 2011, and all the benefits accruing therefrom under 35 U.S.C. §119, the contents of which in its entirety are herein incorporated by reference.

BACKGROUND

This invention relates generally to a database system, and more particularly to accessing a database table within a database system.

Database solutions that use disk storage are built on a principle that all data is stored on a disk system, and that parts of the data can be cached to computer memory for faster performance. In-memory database solutions are built on a principle that all of the data is stored on computer memory, to ensure fast access to the data. In these solutions, the in-memory data can often additionally be written or backed-up to a disk for data persistency reasons. Typical database solutions in the current marketplace use one of these two approaches.

There are several mechanisms to improve database response times such as the use of extensive buffer pooling (caching), processing as much of the data in main memory as possible, using regular disk-based algorithms, and/or making the system less vulnerable to disk operations by using high performance disks (such as solid state drives or "SSDs"). Even though these mechanisms can improve performance, they do not use leveraging algorithms that are optimized for in-memory processing even when all the data is processed in-memory. When processing data inside the main memory, using memory-optimized algorithms can lead to a significant improvement in performance. Buffer pooling mechanisms enable moving of data between a buffer pool and a disk transparently to an application, but the data in the buffer pool cannot be processed using algorithms that are optimized for in-memory usage because of a disk-optimized data layout, for example.

There are also hybrid database solutions that include both an in-memory database technology and disk database technology. In these hybrid solutions, each database table is defined either as in-memory table (m-table), or as an on-disk database table (d-table), forcing the database users to choose either of the two approaches for each table in the database schema. The division is static; rows are not transferred from the m-table to the d-table, and vice-versa, without explicitly using a transaction to insert to one table and delete from the other.

In hybrid database products or architectures having several database servers it is possible to programmatically (at an application level) store some data into an in-memory database server and other data in a disk-based server. Controlling this data placement on the application level is, however, extremely tedious and complicated and increases the vulnerability of the system and may compromise data integrity. Additionally, a challenge with in-memory databases and database tables is that when a database table grows large enough, it cannot be stored in the in-memory database any longer due to lack of available memory. In general, databases tend to grow over time for multiple reasons, and in-memory database tables have a hard limit in terms of the maximum size of the available memory.

One solution for addressing this memory database and database table growth problem is to use a hybrid database table, where some of the rows are handled by way of the in-memory database technology, and some of the rows are handled by way of the disk database technology (i.e., similar to a hybrid database solution, but within one table). A hybrid table keeps all the data logically in the same database table, but the data is physically divided between an in-memory part (m-part), and a disk part (d-part). The paper "Hybrid In-Memory and On-Disk Tables for Speeding-Up Table Access" by Guisado-Gámez et. al, published in Database and Expert Systems Applications, Lecture Notes in Computer Science, 2010, Volume 6261/2011, p.231-240 describes such a hybrid solution. One of the problems with contemporary hybrid tables is the index structure for accessing the data, since in-memory database tables typically have different index structures than disk database tables.

BRIEF SUMMARY

Embodiments include a computer implemented method and a computer program product for operating a database system. A database table that includes a plurality of rows is stored. A first portion of the rows are stored in a memory device and a second portion of the rows are stored in a remote disk device. A request relating to a specific row of the database table is received. An index for the database table is accessed by a computer. The index includes entries for each row of the database table stored in the memory device and entries for a subset of the rows of the database table stored in the remote disk device. It is determined, by the computer, and from the index whether the specific row is stored in the memory device or the remote disk device. A connection is made to the memory device in response to determining that the specific row is stored in the memory device. A connection is made to the remote device in response to determining that the specific row is stored in the remote disk device. An action related to the specific row is performed based on the received request.

Another embodiment is a database system that includes a processing engine, a memory device and a remote disk device. The database system is configured to perform a method that includes storing a database table that includes a plurality of rows. A first portion of the rows are stored in a memory device and a second portion of the rows are stored in a remote disk device. A request relating to a specific row of the database table is received. An index for the database table is accessed by a computer. The index includes entries for each row of the database table stored in the memory device and entries for a subset of the rows of the database table stored in the remote disk device. It is determined, by the computer, from the index whether the specific row is stored in the memory device or the remote disk device. A connection is made to the memory device in response to determining that the specific row is stored in the memory device. A connection is made to the remote device in response to determining that the specific row is stored in the disk device. An action related to the specific row is performed based on the received request.

BRIEF DESCRIPTION OF THE SEVERAL VIEWS OF THE DRAWINGS

Embodiments of the present invention will now be described, by way of example only, with reference to the accompanying drawings, in which.

DETAILED DESCRIPTION

Figure 1:
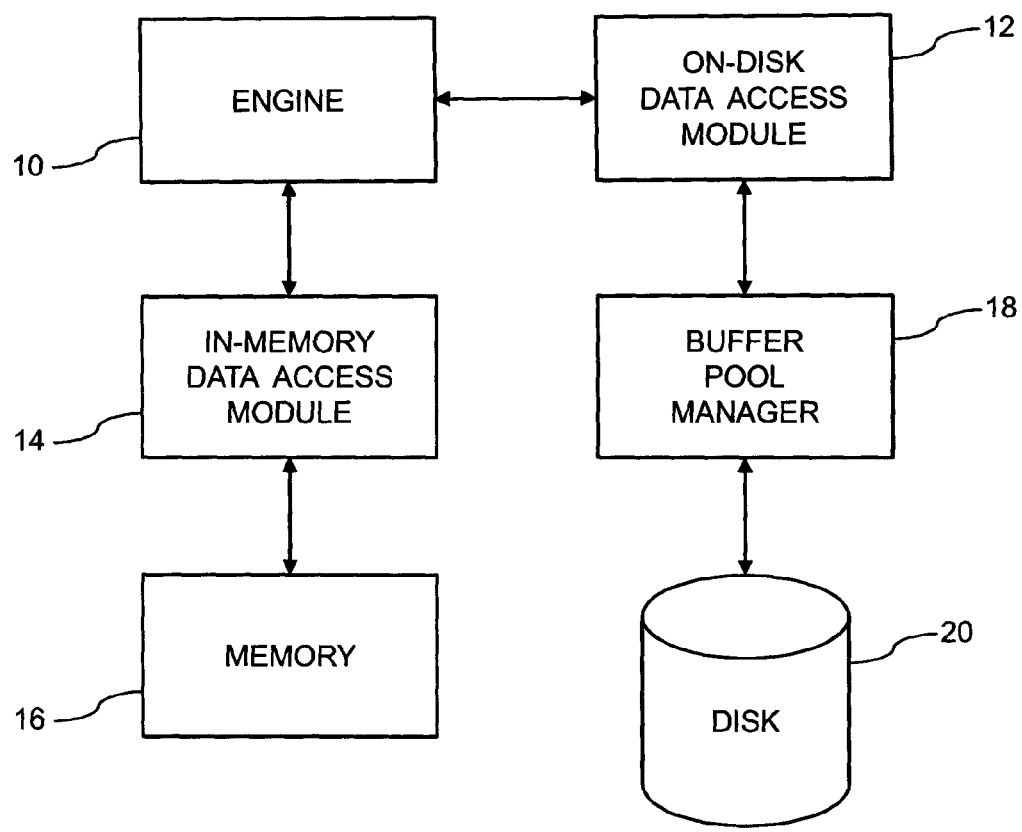
FIG. 1 is a schematic diagram of a database system in accordance with an embodiment.

Embodiments of the present invention provide a hybrid index structure that supports both in-memory and disk based rows in the same relational database table. An embodiment of the hybrid database table is implemented in two parts: one located in memory, and the other on disk. An embodiment provides a method of fast access to large volumes of data in a hybrid database. A hybrid table is used, which includes both in-memory, and disk rows. Rows of the hybrid table are accessed through a hybrid index, which makes it possible to access all the user data (stored in the rows) of the hybrid table through the same index. An embodiment of the invention is a new hybrid index type, where in-memory rows are indexed densely, that is, every row is pointed to by one index entry per index and the on-disk rows are indexed sparsely. Such an indexing scheme has various advantages including that both primary key indexes and secondary key indexes are supported, and that the hybrid index makes it possible to create a consistent checkpoint of a hybrid table more efficiently than if the table was indexed with both an in-memory index and with a separate on-disk index due, for example, to the single access to the table.

The hybrid table index structure described herein combines the capabilities of both forms of storage (memory and disk), ensuring fast access to in-memory data rows and conserving memory for disk data rows. An index refers to a search structure, such as B-tree, or some other tree-like structure. Indexes may have internal nodes and leaf nodes, or leaf nodes only. Nodes including pointers to tuples (instances of table rows) are referred to as leaf nodes. There must be at least one index in which the order of keys corresponds to the ordering of tuples that they refer to. Unlike d-table indexes, in-memory database indexes are typically dense. That is, each index key identifies a row while keys in a disk index address the page where the row being searched is located. Thus, a dense index can have tens of times more keys than a sparse index for an equally large table.

In an embodiment, a hybrid table is accessed by the uniform index for all the data stored in the hybrid table. This is a hybrid index. Since the hybrid index is persistently stored in memory, it is a challenge to fit both table data, and all the indexes into the available memory. It is not possible with a dense index because of its extensive memory usage. A dense index is, however, needed to satisfy strict performance expectations of an in-memory database.

In contemporary database systems that use a hybrid table there is an additional data structure including information about where different keys for the rows are stored, whether they are stored in-memory or on-disk. Every operation on such a hybrid table first finds out where the data that is needed is stored. Then, the data is accessed either through a specific memory index or a specific disk index, or both. In the end, data fetched via different indexes is merged. In contemporary system there are two different indexes, and two different storages.

An embodiment of the present invention uses one hybrid index containing all the data, and two storage devices. There is no requirement to maintain any extra bookkeeping about where key values are located in each of the storage devices. The hybrid index is able to provide seamless access to both the in-memory storage, and to the disk-based storage. This is possible because the index isn't dense (as in a traditional in-memory indexes) or sparse (as disk based indexes often are) but both, depending on the data it is addressing. The hybrid index handles rows on two granularity level based on the location of rows. A dense index part is used for the in-memory rows, and a sparse index is used for on-disk rows. The Guisado-Gámez paper referred to above describes the use of a separate layer above the traditional in-memory and on-disk indexes. This solution uses two indexes, and provides a separate layer to choose, on-the-fly, which one to use.

An embodiment of the present invention uses a new type of index that causes no overhead to in-memory row searches, nor does it for on-disk row searches either. In contemporary systems, if every search required access to an additional data structure, that data structure would soon become a subject of concurrency conflicts that would need to be handled with a concurrency-control mechanism, resulting in additional overhead. Using a single access structure for both storages also makes it possible to execute range queries through the single data structure.

FIG. 1 shows a database system that can be used to store a database table that comprises a plurality of rows in accordance with an embodiment. The system includes a processing engine 10, which is connected to an on-disk data access module 12 and in-memory data access module 14. The in-memory data access module 14 connects to a local memory device 16, and the on-disk data access module 12 connects through a buffer pool manager 18 to a remote disk 20. A hybrid database table is implemented in two parts; one located in the memory 16, and the other on the disk 20. The system provides a method of fast access to bigger volumes of data in a hybrid database.

Any access to the database table stored by the system of FIG. 1 is managed by the engine 10, which will be accessed by one or more applications that require access to the data stored in the rows of the database table. Some of the rows are stored in the local memory 16 and the remainder are stored in the hard disk 20. The embodiment of the system shown in FIG. 1 provides the advantages of the fast access to the rows stored in the memory 16 with the advantage of the size of the memory available from the disk 20, without creating limitations on the access and handling of the data stored in the hybrid database table.

The hybrid storage of the database table provides advantages over the extensive use of buffer pooling. The embodiment of the system shown in FIG. 1 enables the use of high-performance algorithms in main memory operations. The system also has advantages over high performance disk since it also enables the use of high-performance algorithms in the main memory operations. The system further provides advantages over controlling the storage mechanism at the application level which therefore results in lower application complexity and vulnerability to application errors. An embodiment of the solution uses a hybrid table, which includes both in-memory, and disk rows. Rows of a hybrid table are accessed through a hybrid index, which makes it possible to access all the user data (=rows) of the hybrid table through the same index.

The database system shown in FIG. 1 uses a hybrid index for accessing the database table stored within the database, where in-memory rows are indexed densely (every row is pointed to by one index entry per index) and where on-disk rows are sparsely indexed. As a result of this indexing, both primary key indexing, and secondary key indexing are supported. An additional advantage of the hybrid index is that it makes it possible to create a consistent checkpoint of the hybrid table more efficiently due to only a single access to the table being required.

Figure 2:
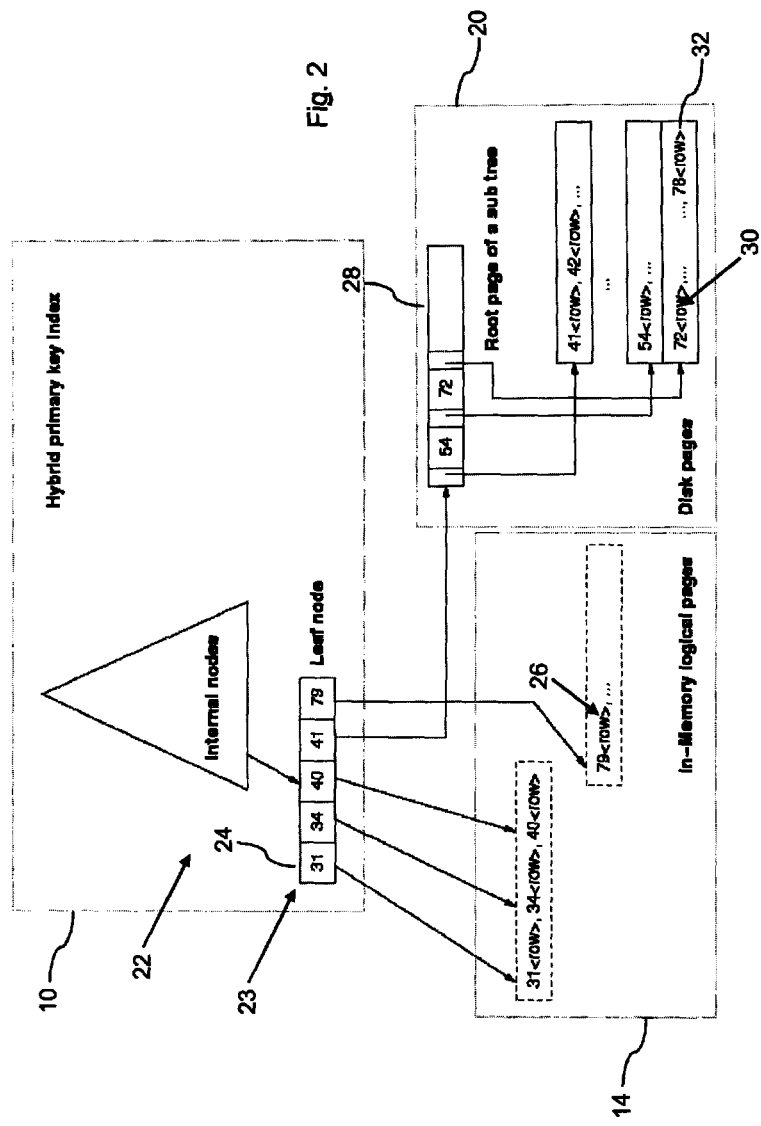
FIG. 2 is a schematic diagram of an index for a hybrid database table in accordance with an embodiment.

FIG. 2 shows an example of the hybrid index 22 in accordance with an embodiment. The hybrid primary key index for in-memory rows are identified as {31, 34, 40, 79}, and for disk rows are identified as {41, 42, . . . , 54, . . . , 72, . . . , 78}. Dotted boxes represent memory-resident logical pages. A key 24 in the hybrid index 22 refers either to an in-memory (m-key) row 26, or a subtree 28 (a disk page at its simplest) including disk rows 30 (d-key). The index 22 is made up of multiple leaf nodes 23. Each leaf node 23 includes a sequence of keys 24, m-keys, and d-keys mixed all together, in ascending order. Each subtree 28 is stored on disk 20, and is pointed to by a key 24 in the leaf node 23, and is a container for d-keys. D-keys are associated with a reference to a page 32 where the corresponding d-row 30 is located. Subtrees 28 can be used in various ways, for example, by creating a subtree 28 for d-keys that share the same leaf node 23. Alternatively, a subtree 28 can contain d-keys whose values fall between two consecutive keys 24 in a leaf node 23.

In an embodiment, a subtree 28 is composed of a single disk page 32 if the number of d-keys is small. A subtree 28 composed of a single page 32 is called a root page of a subtree 28. The subtree 28 shown in FIG. 2 is located on disk 20, although the pages 32 can be located temporarily in page buffer pool 18. When new d-keys are inserted, and the root page overflows, two new pages are created, and the keys 24 stored in the root page are distributed evenly between the two other pages, now called leaf pages. Thus, a pointer to the root page is still valid after the split, and all the d-keys are accessible through the same pointer. In general, common b-tree structures, and algorithms apply to the subtree 28.

Every m-key in every index 22 refers to exactly one m-row 26. Thus, the number of keys 24 referring to an m-row is the number of indexes in the table. On the other hand, the number of d-keys is, at most, equal to the number of disk pages 32. The sparse indexing of disk rows 30 keeps the index size at a minimum, and makes it possible to fit the indexes of very large tables in memory, assuming that the in-memory row part is correctly sized.

The cost, in terms of processing load and time required in an exemplary embodiment, for searching for an in-memory row 26 is the same as in a traditional m-table. Similarly, the cost of searching for a disk row 30 is the same as in traditional d-table. Searching for a set of rows that includes both in-memory and disk rows is no worse than searching the same set of rows for a regular d-table. If the ratio of in-memory rows is high, then the search is less expensive than in a regular d-table. The cost of updates to the database table is also efficient when compared to a non-hybrid table. Updating an in-memory row 26 is equally expensive when compared to an update in a regular m-table. Updating a disk row 30 is as expensive as in a regular d-table. Updating a row set that includes both in-memory and disk rows is no more expensive when compared to a regular d-table.

In an embodiment, the in-memory part of the database table includes a subset of all the rows of the table. The m-part subset is selected based on selection rules specified by the user. The selection unit is either page or row. Page granularity is useful when selection of the m-part is based on a continuous primary key value range. It also can be used as an extensive buffer pool based on a LRU (least recently used) algorithm or some other common page caching algorithm, where some rows (pages) are in the m-part 14, some are in the traditional buffer pool 18, and the rest are on disk 20. When the selection unit is a row, the user has an almost endless variety of possible selection rules. The rules could be, for example, select rows, which have a key whose value belongs to specified value range, are updated no more than three days ago, are among 50,000 most recently used, or are among 10,000 most recently inserted. The engine 10 has a user interface to allow the user for mechanism to insert selection rules.

Embodiments of the hybrid database table and its associated hybrid index support various user operations. The most common index operations are inserting, deleting, and searching a key from index. When data is moved from the d-part 20 to the m-part 14, and vice versa, index operations will be triggered. Index operations are described in more detail below. Row management may be performed in various ways depending on the database engine implementation.

In an embodiment, a user or an application can search for a key in the database table via the hybrid index 22. The engine 10 performs a defined algorithm to find the location of the row in the database table that corresponds to the requested key 24. If key 24 being sought is found within the leaf node 23, then the engine 10 can return its address. Otherwise the engine 10 continues the search in the subtree 28, if such exists. A return of NULL is made if the matching key cannot be found either in the leaf node or from the subtree 28. The following pseudo-code defines an embodiment of a search algorithm that can be used by the engine 10:

```
/* Initial state: a leaf node is found in which the lowest value key is
 * less than or equal to the search key, and whose successor leaf node
 * includes only keys greater than the search key
 */
/* Purpose: Search by key in the leaf node */
skey:=search key
n:=leaf node
new_key:=first key in n
previous_key := new_key
while new_key<skey
loop
        if next_key(new_key)=NULL
        then /* search reached the last key of the leaf node */
            break;
        else
            previous_key := new_key
            new_key:=next_key(new_key)
endif
end loop
/* Either there is an exact match or a value is possibly in the subtree.
 * Return the row in memory, or search the subtree
 */
if new_key=skey
then    /* found match either in memory or subtree */
        if refers_to_subtree(new_key)
        then    /* it is a subtree match */
            return search_subtree(new_key)
        else /* it is an in-memory match */
            return addr_of(newkey)
        endif
else
    if new_key>skey
    then    /* found probably the low value of a subtree */
```

```
            if refers_to_subtree(previous_key)
            then    /* search continues in subtree */
                    return search_subtree(previous_key)
            else
                    return NULL
            endif
    else
            if refers_to_subtree(new_key)
            then    /* search continues in subtree */
                    return search_subtree(new_key)
            else
                    return NULL
            endif
    endif
endif
```

Figure 3:
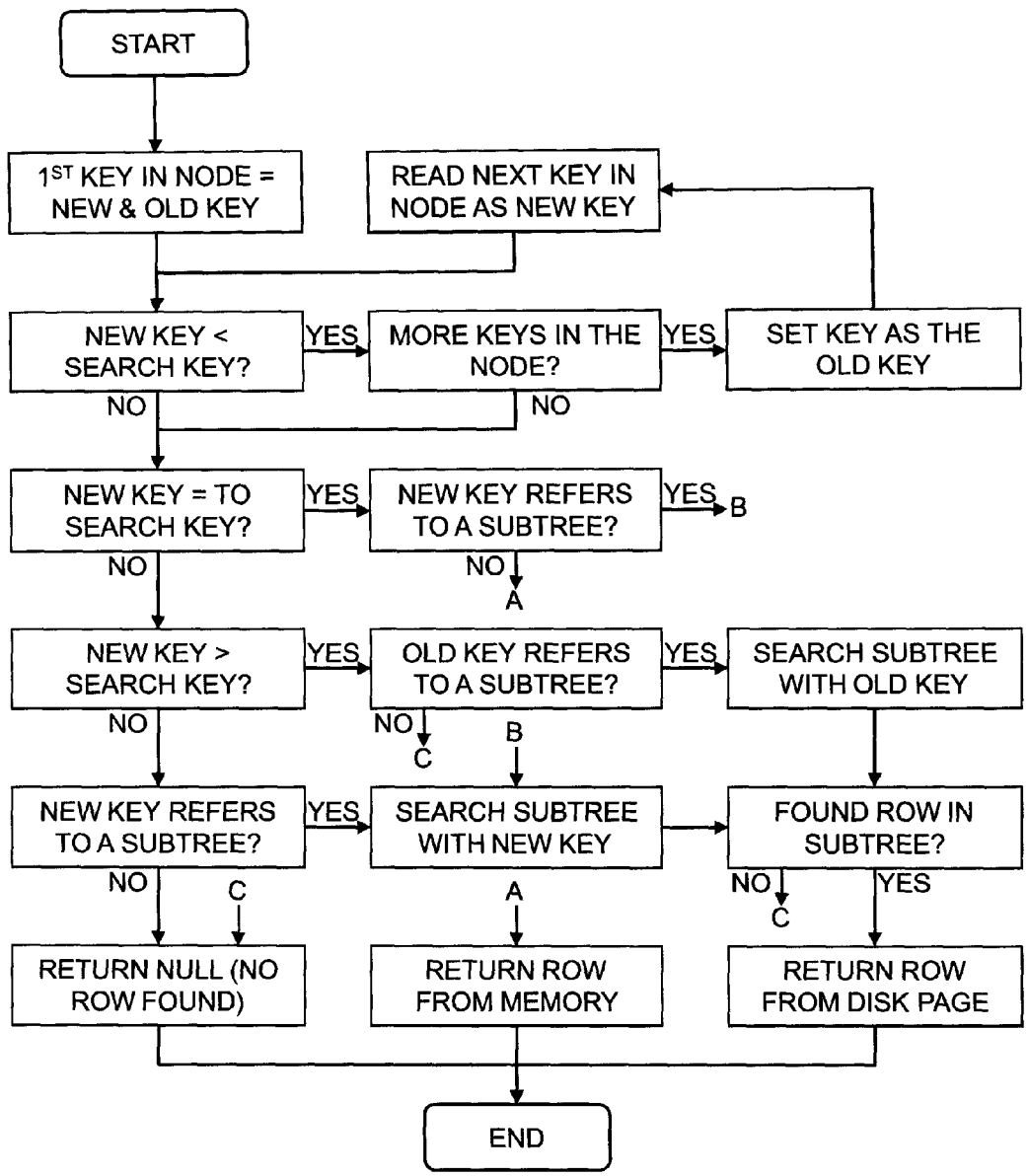
FIG. 3 is a flowchart of a search operation on the hybrid index in accordance with an embodiment.

FIG. 3 is flowchart summarizing the operation of the above pseudo-code. The flowchart can be better understood with an example. Given a leaf node with the following keys [34, 35, 36, 40, 52], where the keys all refer to in-memory rows apart from the key 40 which refers to a subtree stored on-disk. If the search key is 40, then this is the row that is being sought. The process will start with the first key in the index (34) and this will be set as the new and old key (old key=previous key in the pseudo-code above). A check is then made to see if the new key (34) is less than the search key (40). At this point, this is true, so a check is made to see if there are more keys in the leaf node and if there are the algorithm moves onto the next key (35) adjusting the values for "old key" and "new key". This part of the algorithm will continue to cycle until new key is set to 40. At this point, the check "new key<search key" will not be true and the algorithm will move to the box "new key=search key" and since this will be true (both equal to 40), the process will continue to the box "new key refers to a subtree?" In this example, this is true, as the entry 40 in this leaf node of the hybrid index does indeed refer to a subtree. The answer "yes" moves to the link "B", which leads to the box "search subtree with new key." A check is then made to see if the desired row has been found in the subtree. If not, then the algorithm will move through the link "C" to return a NULL. If the row has been found in the subtree, then the process returns the desired row address from the appropriate disk page and the method terminates. Different situations regarding the leaf node keys will cause the algorithm to operate in different ways, but always returning the correct result of either NULL or the in-memory or on-disk address of the search key.

Figure 4:
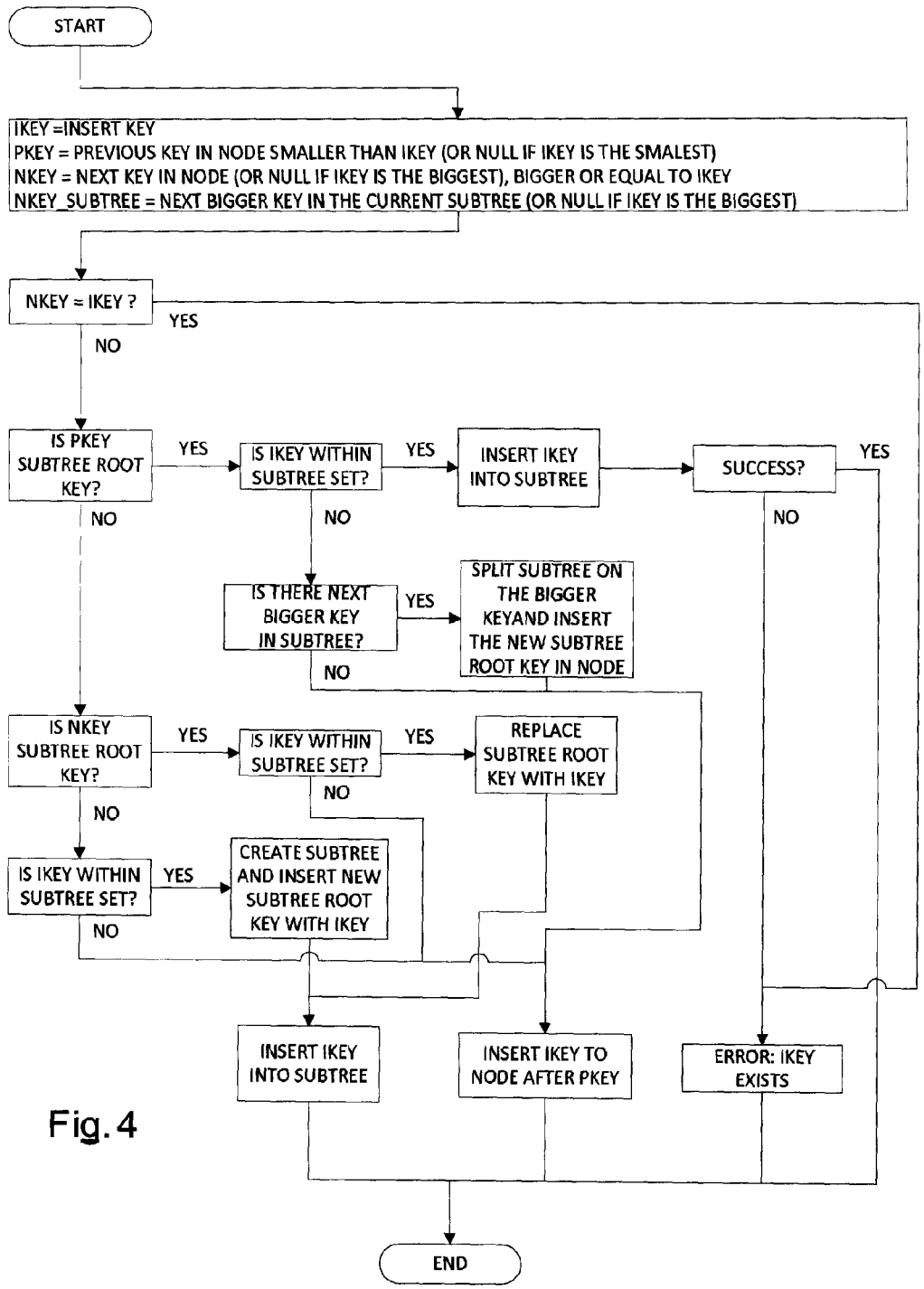
FIG. 4 is a flowchart of an insert operation on the hybrid index in accordance with an embodiment.

The following pseudo-code defines an embodiment of an algorithm, embodied as a flowchart in FIG. 4, which can be used by the engine 20 when a user or application is inserting a new key into the database table being stored by the database system.

```
/* Initial state: a leaf node is found where the smallest key is less than or
* equal to the search key, and whose successor leaf node includes only
* larger keys than the search key, or the successor does not exist. A
* position in the leaf node of the smallest key value bigger than the value
  of the insert key is found.
*/
/* Purpose: insert a unique key, unless there exists one. To determine
whether the key is an m-key or d-key, a function
key_is_within_subtree_key_set( ) is used, returning
TRUE if the insert key is a d-key.
lnode := leaf node
ikey := insert key value
pkey := biggest key value in lnode smaller than ikey or NULL if ikey is
smallest
nkey := smallest key value in lnode not smaller than ikey or NULL if ikey
is biggest
nkey_subtree := NULL /* smallest key value in subtree bigger than
ikey */
ipos := get_position(nkey) /* position of nkey, or if nkey is NULL, then
first position after pkey */
if (nkey = ikey)
then /* insert key already exists */
        return ERROR
endif
if key_is_subtree_root_key(pkey)
then    /* the previous key is a d-part key */
        if key_is_within_subtree_key_set(ikey)
        then    /* Insert key belongs to the pre-defined d-key set
* insert in subtree and leaf node doesn't change
*/
                retcode := insert_to_subtree(ikey)
                if retcode = SUCCESS
                then
                        return SUCCESS
                else /* insert key already exists */
                        return ERROR
                endif
        else /* Insert key goes between two sets of d-keys get smallest
* subtree key bigger than ikey, or NULL if doesn't exist */
                nkey_subtree :=
                current_subtree_get_next_bigger_key(ikey)
                if nkey_subtree != NULL
                then    /* ikey goes between two sub tree keys,
* add next bigger sub tree key to leaf node
*/
                        current_subtree_split(nkey_subtree)
                        return insert_key_to_leaf_node(nkey_subtree)
/* insert nkey_subtree to leaf node */
                else    /* it is an m-key: move bigger keys 'right', and
* insert ikey to leaf node
*/
                        return insert_key_to_leaf_node(ikey)
                endif
        endif
else    /* the previous key is a an m-part key */
        if key_is_subtree_root_key(nkey)
        then /* the next key is a an d-part key */
                if key_is_within_subtree_key_set(ikey)
                then /* nkey will be replaced by smaller ikey referring
                        to this subtree */
                        replace_subtree_root_key_in_leaf_node(nkey,
                           ikey)
                        return current_subtree_insert_key(ikey)
                else    /* it is an m-key: move bigger keys 'right', and
* insert ikey to leaf node
*/
                        return insert_key_to_leaf_node(ikey)
                endif
        else /* no subtree existing */
                if key_is_within_subtree_key_set(ikey)
                then /* create a subtree and insert first key to subtree */
                        create_subtree(ikey)
                        return insert_to_subtree(ikey)
                else    /* it is an m-key: move bigger keys 'right', and
* insert ikey to leaf node
*/
                        return insert_key_to_leaf_node(ikey)
                endif
        endif
endif
```

If the new key goes between two in-memory keys, the insert is executed by inserting the new key into the leaf node. If the previous key refers to a disk page, then the new key may belong between two d-keys. For example, a leaf node may include the following keys: [31, 34, 40, 41, 79] of which 41, 42, . . . , 52, . . . , 78 are stored on a subtree on a disk. By inserting a new m-row with key value 50, this causes the addition of key 50, and a new key to the leaf node to point to the subtree. As a result, the leaf node will includes keys [31, 34, 40, 41, 50, 52, 79] of which 41 and 52 refer to the subtrees including all the disk keys.

Figure 5:
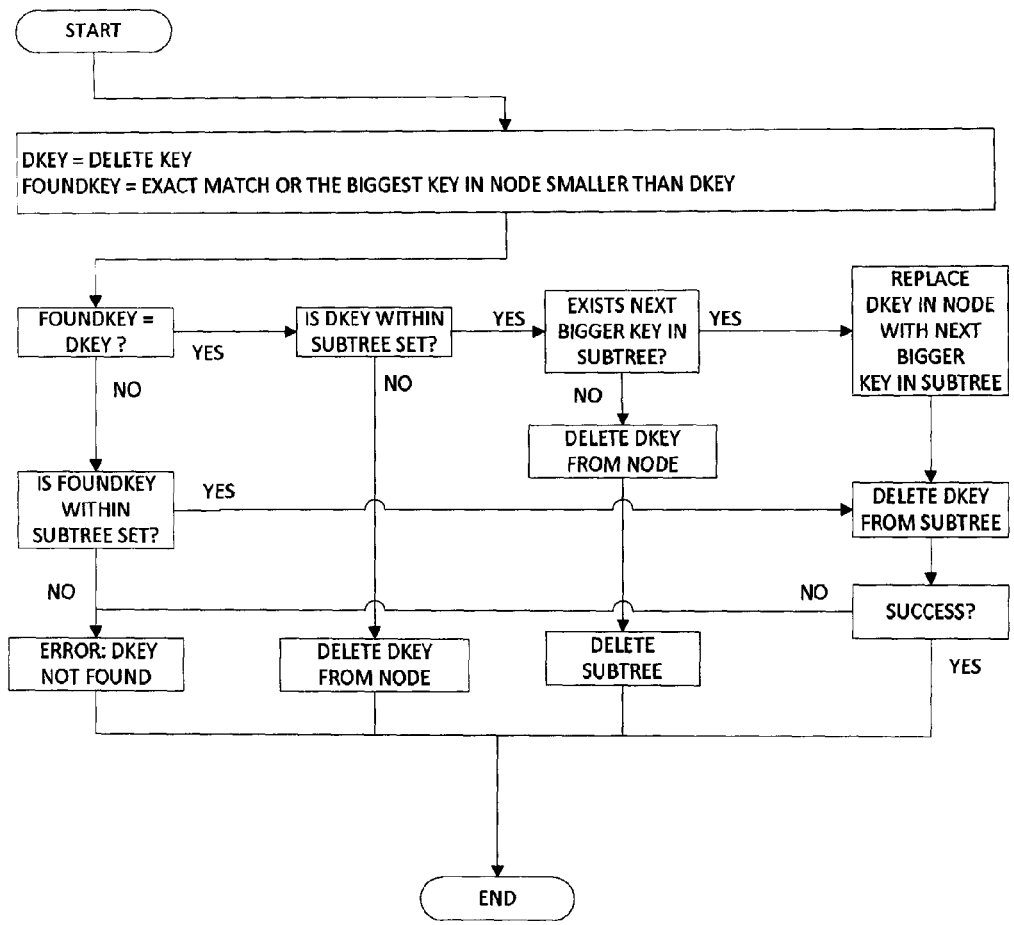
FIG. 5 is a flowchart of a delete operation on the hybrid index in accordance with an embodiment.

The following pseudo-code defines an embodiment of an algorithm, embodied as a flowchart in FIG. 5, which can be used by the engine 20 when a user or application deletes an existing key from the database table being stored by the database system.

```
/* Initial state: a leaf node is found whose smallest key is less than,
 * or equal to the search key, and whose successor leaf node includes
 * only larger keys than the search key, or the successor does not exist.
 * Then find the position of the search key, or if it doesn't exist, then the
 * biggest key value smaller than the search key.
 */
lnode := leaf node
dkey := delete key value
found_key := exact match, or biggest key value in lnode smaller than
dkey
dpos := get_position(found_key) /* position of found_key */
retcode := SUCCESS
if found_key = dkey /* delete key is an m-row key or root of a subtree */
then
        if key_is_within_subtree_key_set(dkey) /* root of a
        subtree */
          then    /* get smallest subtree key, which is bigger than the
* dkey, or NULL if it doesn't exist
*/
                nkey_subtree :=
                current_subtree_get_next_bigger_key(dkey)
                if nkey_subtree != NULL
                then /* dkey will be replaced with nkey_subtree
                referring to subtree */
                        replace_subtree_root_key_in_leaf_node(dkey,
                        nkey_subtree)
                        return current_subtree_return delete_key(dkey)
                else /* dkey is the only key in subtree thus it is deleted
                from lnode */
                        delete_key_from_leaf_node(dkey)
                        /* the subtree would be empty therefore delete it */
                        return delete_current_subtree( )
                endif
        else /* delete key, and shift other keys left */
        return delete_key_from_leaf_node(dkey)
        endif
else
        if key_is_within_subtree_key_set(found_key)
        then /*can be in the subtree*/
        retcode := current_subtree_return delete_key(dkey)
                if retcode = SUCCESS
                        return SUCCESS
                else
                        return ERROR /* dkey not found */
                endif
        else
                return ERROR /* dkey not found */
        endif
endif
```

Deleting a key in the hybrid index is done either on disk or in memory, depending on the specific storage device upon which the row resides. If a key is a root of a subtree, (such as 41 in FIG. 1), it is replaced with a next bigger value of the subtree, and deleted from the subtree. An in-memory key will be searched and deleted as in pure m-table. If both sibling keys refer to the disk 20, the larger key can be removed from the leaf node in addition to the deleted key. If the deleted key is stored on the disk 20, it is searched, and deleted on the disk page. Any leaf node/disk page join (with its sibling) is done according to common in-memory index/disk-based b-tree algorithms, respectively.

Figure 6:
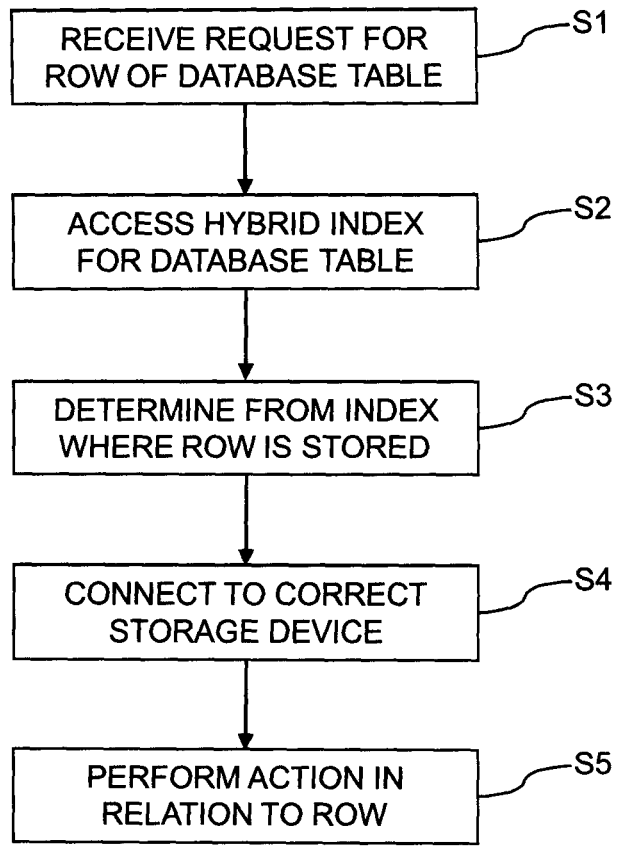
FIG. 6 is a flowchart of a method of operating the database system in accordance with an embodiment.

FIG. 6 summarizes an embodiment of an overall method of operating the database system, regardless of the type of action being taken by a user or an application in respect to a specific row of the table. The method is executed by the processing engine either as a hardware process or as a set of instructions from a computer program product on a computer readable medium. The method includes, at block S1, receiving a request relating to a specific row of the database table, and at block S2 accessing an index for the database table, the index including, for rows of the database table stored in the local memory device, entries for each row of the database table stored in the local memory device, and for rows of the database table stored in the remote disk device, entries for only some of the rows of the database table stored in the remote disk device.

At block S3, it is determined from the index whether the specific row is stored in the local memory device or the remote disk device. At block S4, a connection is made to the local memory device or to the remote disk device according to the prior determination, and at block S5, an action related to the specified row is performed according to the received request. The action could be a simple access, reading the data present in the row, or could be a more complicated action such as the deletion or amendment of an entry in the database.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The invention claimed is:

1. A computer implemented method for operating a database system, the method comprising:
   storing a database table comprising a plurality of rows, a first portion of the rows stored in a memory device and a second portion of the rows stored in a disk device;
   receiving a request relating to a specific row of the database table;
   accessing, by a computer, an index for the database table, the index comprising entries for each row of the database table stored in the memory device and entries for a subset of the rows of the database table stored in the disk device, wherein the subset of the rows of the database table stored in the disk device are not stored in the memory device and wherein the index has densely indexed rows that correspond to the subset of the rows of the database table stored in memory device and sparsely indexed rows that correspond to the subset of the rows of the database table stored in the disk device;
   performing, by the computer, a search on the index to determine existence of the specific requested row;

determining, by the computer, from the index whether the specific row is stored in the memory device or the disk device based on a key type provided in the index that corresponds to the specific requested row wherein a first key type is provided for rows stored in the memory device and a second key type is provided for rows stored in the disk device, wherein the first key type is an identification of a row address in the memory device and wherein the second key type is an identification of a page address in the disk device;

connecting to the memory device responsive to determining that the specific row is stored in the memory device;

connecting to the disk device responsive to determining that the specific row is stored in the disk device; and performing an action related to the specific row, the action responsive to the received request.

2. A method according to claim 1, wherein the index for the database table comprises, for the rows of the database table stored in the disk device, entries for specific disk pages of the disk device, each disk page storing multiple rows of the database table.

3. A method according to claim 1, further comprising storing one or more subtrees on the disk device, each subtree including entries for specific disk pages of the disk device, each disk page storing multiple rows of the database table, wherein the index for the database table comprises, for the rows of the database table stored in the disk device, entries for specific subtrees.

4. A method according to claim 2, further comprising dividing the database table between the memory device and the disk device according to one or more user defined selection rules.

5. A method according to claim 1, wherein the index comprises a plurality of leaf nodes, each leaf node comprising a plurality of entries for at least one of rows of the database table stored in the memory device and rows of the database table stored in the disk device.

6. A method according to claim 5, wherein upon determining that the specific requested row relates to the memory device:
(a) processing information by first starting with a first key provided in the index associated with the specific requested row;
(b) upon processing completion, moving from the first key to a next key associated with the memory device for the requested row;
(c) setting the first key as an old key upon processing completion and the next key as a new key; and
(d) reiterating steps (a) through (c) until there are no more next keys remaining.

7. The method of claim 5, wherein the leaf nodes each include a plurality of keys provided to indicate the memory device and at least one key provided to indicate the disk device.

8. The method of claim 7, wherein a plurality of disk pages are associated with the disk key in the index.

9. The method of claim 7, wherein if the new key falls between keys belonging to the memory, the new key is inserted into the leaf node and wherein deletion of a key includes replacing a root of a subtree with a next bigger value of the subtree.

10. A database system comprising:
a processing engine, a memory device and a disk device, the database system configured to perform a method comprising:
storing a database table comprising a plurality of rows, a first portion of the rows stored in the memory device and a second portion of the rows stored in the disk device, wherein the subset of the rows of the database table stored in the disk device are not stored in the memory device;
receiving a request relating to a specific row of the database table;
accessing an index for the database table, the index comprising entries for each row of the database table stored in the memory device and entries for a subset of the rows of the database table stored in the disk device, wherein the index has densely indexed rows that correspond to the subset of the rows of the database table stored in memory device and sparsely indexed rows that correspond to the subset of the rows of the database table stored in the disk device;
determining from the index whether the specific row is stored in the memory device or the disk device by reviewing a key type provided in the index table wherein the key type includes a first key type that is an identification of a row address in the memory device and wherein a second key type that is an identification of a page address in the disk device;
connecting to the memory device or the disk device according to the prior determination; and
performing an action related to the specific row, the action responsive to the received request.

11. A system according to claim 10, wherein the index for the database table comprises, for the rows of the database table stored in the disk device, entries for specific disk pages of the disk device, each disk page storing multiple rows of the database table.

12. A system according to claim 11, wherein the disk device is arranged to store one or more subtrees, each subtree including entries for specific disk pages of the disk device, each disk page storing multiple rows of the database table, wherein the index for the database table comprises, for the rows of the database table stored in the disk device, entries for specific subtrees.

13. A system according to claim 12, wherein the method further comprises dividing the database table between the memory device and the disk device according to one or more user defined selection rules.

14. A system according to claim 13, wherein the index comprises a plurality of leaf nodes, each leaf node comprising a plurality of entries for at least one of rows of the database table stored in a memory device and rows of the database table stored in a disk device.

15. A computer program product for operating a database system, the computer program product comprising:
a non-transitory computer readable storage medium having computer readable program code embodied therewith, the computer readable program code comprising:
computer readable program code configured for:
storing a database table comprising a plurality of rows, a first portion of the rows stored in a memory device and a second portion of the rows stored in a disk device;
receiving a request relating to a specific row of the database table;
accessing an index for the database table, the index comprising entries for each row of the database table stored in the memory device and entries for a subset of the rows of the database table stored in the disk device, wherein the subset of the rows of the database table stored in the disk device are not stored in the memory device and wherein the index has densely indexed rows that correspond to the subset of the rows of the database table stored in memory device and sparsely indexed rows that correspond to the subset of the rows of the database table stored in the disk device;

determining from the index whether the specific row is stored in the memory device or the disk device based on a key type provided in the index that corresponds to the specific requested row wherein a first key type is provided for rows stored in the memory device and a second key type is provided for rows stored in the disk device, wherein the first key type is an identification of a row address in the memory device and wherein the second key type is an identification of a page address in the disk device;

connecting to the memory device responsive to determining that the specific row is stored in the memory device;

connecting to the disk device responsive to determining that the specific row is stored in the disk device; and performing an action related to the specific row, the action responsive to the received request such that a search is performed on the index to determine existence of the specific requested row.

16. The computer program product according to claim 15, wherein the index for the database table comprises, for the rows of the database table stored in the disk device, entries for specific disk pages of the disk device, each disk page storing multiple rows of the database table.

17. The computer program product according to claim 15, wherein the computer readable program code is further configured for storing one or more subtrees on the disk device, each subtree including entries for specific disk pages of the disk device, each disk page storing multiple rows of the database table, wherein the index for the database table comprises, for the rows of the database table stored in the disk device, entries for specific subtrees.

18. The computer program product according to claim 15, wherein the computer readable program code is further configured for dividing the database table between the memory device and the disk device according to one or more user defined selection rules.

19. The computer program product according to claim 15, wherein the index comprises a plurality of leaf nodes, each leaf node comprising a plurality of entries for at least one of rows of the database table stored in the memory device and rows of the database table stored in the disk device, further comprising:

upon determination that the specific requested row relates to the memory device:

(a) processing information by first starting with a first key provided in the index associated with the specific requested row;

(b) upon processing completion, moving from the first key to a next key associated with the memory device for the requested row;

(c) setting the first key as an old key upon processing completion and the next key as a new key; and (d) reiterating steps (a) through (c) until there are no more next keys remaining.

* * * * *